(12) United States Patent
Thorstensen-Woll

(10) Patent No.: US 8,522,990 B2
(45) Date of Patent: Sep. 3, 2013

(54) CONTAINER SEAL WITH REMOVAL TAB AND HOLOGRAPHIC SECURITY RING SEAL

(75) Inventor: Robert William Thorstensen-Woll, Barrie Ontario (CA)

(73) Assignee: Selig Sealing Products, Inc., Forrest, IL (US)

( * ) Notice: Subject to any disclaimer, the term of this patent is extended or adjusted under 35 U.S.C. 154(b) by 726 days.

(21) Appl. No.: 12/026,766

(22) Filed: Feb. 6, 2008

(65) Prior Publication Data

US 2008/0231922 A1    Sep. 25, 2008

Related U.S. Application Data

(60) Provisional application No. 60/896,820, filed on Mar. 23, 2007.

(51) Int. Cl.
| B65D 51/18 | (2006.01) |
| B29D 22/00 | (2006.01) |
| G03H 1/00 | (2006.01) |

(52) U.S. Cl.
USPC .............. 215/232; 428/35.9; 428/40.1; 359/2

(58) Field of Classification Search
USPC ........... 359/2, 3, 572; 215/232, 364; 283/86; 428/35.9
See application file for complete search history.

(56) References Cited

U.S. PATENT DOCUMENTS

| 4,013,188 A | 3/1977 | Ray |
| 4,206,165 A | 6/1980 | Dukess |
| 4,266,687 A | 5/1981 | Cummings |
| 4,438,850 A | 3/1984 | Kahn |
| 4,514,248 A | 4/1985 | Cummings |
| 4,579,240 A | 4/1986 | Ou-Yang |
| 4,650,082 A | 3/1987 | Paciorek |

(Continued)

FOREIGN PATENT DOCUMENTS

| AT | 501 393 A1 | 8/2006 |
| AT | 11 738 U1 | 4/2011 |

(Continued)

*Primary Examiner* — Audrey Y Chang
(74) *Attorney, Agent, or Firm* — Fitch, Even, Tabin & Flannery, LLP

(57) ABSTRACT

A holographic sealing member for a container is designed for attachment to the rim of an opening in the container. The holographic sealing member comprises a holographic layer having an upper plastic layer on its upper side and a lower embossed image layer on its lower side. A sealant or adhesive layer is attached to at least those portions of the lower side of the holographic layer that are intended to come into direct contact with the container's rim when the sealing member is placed upon and is sealed to a container. A metal foil layer lies over and covers and is adhesively bonded to the upper side of the holographic layer and may be inductively heated to actuate the heat actuated sealant. A tab covers and is adhesively bonded to the metal foil layer and may be pulled to remove the sealing member from a container. After this sealing member is attached to a container, and when the tab is pulled to remove the sealing member from the container, almost the entire sealing member pulls away from the container, but those portions of the holographic layer's lower embossed image layer that are attached directly to the rim of the container by the sealant or adhesive layer remain attached to the rim of the container to form a hologram that runs around the container's rim.

12 Claims, 1 Drawing Sheet

(56) References Cited

U.S. PATENT DOCUMENTS

| | | | |
|---|---|---|---|
| 4,741,791 | A | 5/1988 | Howard et al. |
| 4,767,016 | A | 8/1988 | Cook, Jr. et al. |
| 4,837,061 | A | 6/1989 | Smits et al. |
| 4,856,857 | A * | 8/1989 | Takeuchi et al. ............... 359/3 |
| 4,892,209 | A | 1/1990 | Dorfman et al. |
| 4,934,544 | A | 6/1990 | Han et al. |
| 4,961,986 | A | 10/1990 | Galda et al. |
| 4,980,222 | A | 12/1990 | Rivera et al. |
| 4,994,314 | A | 2/1991 | Rosenfeld et al. |
| 5,004,111 | A | 4/1991 | McCarthy |
| 5,015,318 | A | 5/1991 | Smits et al. |
| 5,055,150 | A | 10/1991 | Rosenfeld et al. |
| 5,057,365 | A | 10/1991 | Finkelstein et al. |
| 5,071,710 | A | 12/1991 | Smits et al. |
| 5,084,143 | A | 1/1992 | Smith |
| 5,098,495 | A | 3/1992 | Smits et al. |
| 5,128,779 | A | 7/1992 | Mallik |
| 5,135,262 | A | 8/1992 | Smith et al. |
| 5,149,386 | A | 9/1992 | Smits et al. |
| 5,153,042 | A | 10/1992 | Indrelie |
| 5,160,767 | A | 11/1992 | Genske et al. |
| 5,169,707 | A | 12/1992 | Faykish et al. |
| 5,178,967 | A | 1/1993 | Rosenfeld et al. |
| 5,197,618 | A | 3/1993 | Goth |
| 5,218,472 | A | 6/1993 | Jozefowicz et al. |
| 5,226,281 | A | 7/1993 | Han et al. |
| 5,265,745 | A * | 11/1993 | Pereyra et al. ............... 215/232 |
| 5,319,475 | A | 6/1994 | Kay et al. |
| 5,510,171 | A | 4/1996 | Faykish |
| 5,514,442 | A | 5/1996 | Galda et al. |
| 5,544,770 | A | 8/1996 | Travisano |
| 5,598,940 | A | 2/1997 | Finkelstein et al. |
| 5,601,200 | A | 2/1997 | Finkelstein et al. |
| 5,615,789 | A | 4/1997 | Finkelstein et al. |
| 5,656,360 | A | 8/1997 | Faykish et al. |
| 5,669,521 | A | 9/1997 | Wiening et al. |
| 5,702,015 | A | 12/1997 | Giles et al. |
| 6,082,566 | A | 7/2000 | Yousif et al. |
| 6,120,882 | A | 9/2000 | Faykish et al. |
| 6,131,754 | A | 10/2000 | Smelko |
| 6,139,931 | A | 10/2000 | Finkelstein et al. |
| 6,194,042 | B1 | 2/2001 | Finkelstein et al. |
| 6,258,425 | B1 | 7/2001 | Parmentier et al. |
| 6,284,337 | B1 | 9/2001 | Lorimor et al. |
| 6,312,776 | B1 | 11/2001 | Finkelstein et al. |
| 6,351,537 | B1 | 2/2002 | Dovgodko et al. |
| 6,378,715 | B1 | 4/2002 | Finkelstein et al. |
| 6,458,302 | B1 | 10/2002 | Shifflet |
| 6,494,491 | B1 | 12/2002 | Zeiter et al. |
| 6,531,230 | B1 | 3/2003 | Weber et al. |
| 6,602,309 | B2 | 8/2003 | Vizulis et al. |
| 6,659,507 | B2 | 12/2003 | Banahan |
| 6,699,566 | B2 | 3/2004 | Zeiter et al. |
| 6,705,467 | B1 | 3/2004 | Kancsar et al. |
| 6,722,272 | B2 | 4/2004 | Jud |
| 6,737,154 | B2 | 5/2004 | Jonza et al. |
| 6,767,425 | B2 | 7/2004 | Meier |
| 6,775,036 | B2 | 8/2004 | Cox et al. |
| 6,866,926 | B1 | 3/2005 | Smelko et al. |
| 6,902,075 | B2 * | 6/2005 | O'Brien et al. ............... 215/232 |
| 6,916,516 | B1 | 7/2005 | Gerber et al. |
| 6,955,736 | B2 | 10/2005 | Rosenberger et al. |
| 6,974,045 | B1 | 12/2005 | Trombach et al. |
| 7,005,178 | B2 | 2/2006 | Bonkowski et al. |
| 7,012,032 | B2 | 3/2006 | Cosentino et al. |
| 7,029,745 | B2 | 4/2006 | Bonkowski et al. |
| 7,064,897 | B2 | 6/2006 | Hebrink et al. |
| 7,128,210 | B2 | 10/2006 | Razeti et al. |
| 7,144,617 | B2 | 12/2006 | Schilling et al. |
| 7,182,475 | B2 | 2/2007 | Kramer et al. |
| 7,224,528 | B2 | 5/2007 | Phillips et al. |
| RE39,790 | E | 8/2007 | Fuchs et al. |
| 7,316,760 | B2 | 1/2008 | Nageli |
| 7,448,153 | B2 | 11/2008 | Maliner et al. |
| 7,531,228 | B2 | 5/2009 | Perre et al. |
| 7,713,605 | B2 | 5/2010 | Yousif et al. |
| 7,740,927 | B2 * | 6/2010 | Yousif et al. ............... 428/40.1 |
| 7,819,266 | B2 | 10/2010 | Ross et al. |
| 7,838,109 | B2 | 11/2010 | Declerck |
| 2002/0068140 | A1 | 6/2002 | Finkelstein et al. |
| 2004/0109963 | A1 | 6/2004 | Zaggia et al. |
| 2004/0209028 | A1 | 10/2004 | Gosselin |
| 2005/0048307 | A1 | 3/2005 | Schubert et al. |
| 2005/0208242 | A1 | 9/2005 | Smelko et al. |
| 2006/0000545 | A1 | 1/2006 | Nageli et al. |
| 2006/0003120 | A1 | 1/2006 | Nageli et al. |
| 2006/0003122 | A1 | 1/2006 | Nageli et al. |
| 2006/0151415 | A1 | 7/2006 | Smelko et al. |
| 2007/0058227 | A1 | 3/2007 | Raksha et al. |
| 2007/0183047 | A1 | 8/2007 | Phillips et al. |
| 2007/0195392 | A1 | 8/2007 | Phillips et al. |
| 2007/0206249 | A1 | 9/2007 | Phillips et al. |
| 2007/0298273 | A1 | 12/2007 | Thies et al. |
| 2008/0026171 | A1 | 1/2008 | Gullick et al. |
| 2008/0103262 | A1 | 5/2008 | Haschke et al. |
| 2008/0156443 | A1 | 7/2008 | Schaefer et al. |
| 2008/0233424 | A1 * | 9/2008 | Thorstensen-Woll et al. ............... 428/621 |
| 2008/0257850 | A1 * | 10/2008 | O'Keefe-Broadbent ..... 215/230 |
| 2009/0078671 | A1 | 3/2009 | Triquet et al. |
| 2009/0208729 | A1 | 8/2009 | Allegaert et al. |
| 2010/0009162 | A1 | 1/2010 | Rothweiler |
| 2010/0030180 | A1 | 2/2010 | Declerck |
| 2010/0059942 | A1 | 3/2010 | Rothweiler |
| 2010/0116410 | A1 | 5/2010 | Yousif |
| 2010/0155288 | A1 | 6/2010 | Harper et al. |
| 2010/0170820 | A1 | 7/2010 | Leplatois et al. |
| 2010/0213193 | A1 | 8/2010 | Helmlinger et al. |
| 2010/0221483 | A1 | 9/2010 | Gonzalez Carro et al. |
| 2010/0290663 | A1 | 11/2010 | Trassl et al. |
| 2010/0314278 | A1 | 12/2010 | Fonteyne et al. |
| 2011/0000917 | A1 | 1/2011 | Wolters et al. |
| 2011/0005961 | A1 | 1/2011 | Leplatois et al. |
| 2011/0091715 | A1 | 4/2011 | Rakutt et al. |

FOREIGN PATENT DOCUMENTS

| | | |
|---|---|---|
| BR | 8200231 U | 9/2003 |
| BR | 0300992 A | 11/2004 |
| DE | 102 04 281 A1 | 8/2003 |
| DE | 10 2006 030 118 B3 | 5/2007 |
| DE | 10 2007 022 935 B4 | 4/2009 |
| DE | 20 2009 000 245 U1 | 4/2009 |
| EP | 0 668 221 A1 | 8/1995 |
| EP | 0 826 598 A2 | 3/1998 |
| EP | 0 826 599 A2 | 3/1998 |
| EP | 0 717 710 B1 | 4/1999 |
| EP | 0 915 026 A1 | 5/1999 |
| EP | 0 706 473 B1 | 8/1999 |
| EP | 0 803 445 B1 | 11/2003 |
| EP | 1 834 893 A1 | 9/2007 |
| EP | 1 839 898 A1 | 10/2007 |
| EP | 1 839 899 A1 | 10/2007 |
| EP | 1 857 275 A1 | 11/2007 |
| EP | 1 873 078 A1 | 1/2008 |
| EP | 1 445 209 B1 | 5/2008 |
| EP | 1 918 094 A1 | 5/2008 |
| EP | 1 935 636 A1 | 6/2008 |
| EP | 1 968 020 A1 | 9/2008 |
| EP | 1 992 476 A1 | 11/2008 |
| EP | 2 230 190 A1 | 9/2010 |
| EP | 2 292 524 A1 | 3/2011 |
| FR | 2 754 375 A1 | 4/1998 |
| FR | 2 916 157 A1 | 11/2008 |
| FR | 2 943 322 A1 | 9/2010 |
| GB | 2241230 A * | 8/1991 |
| GB | 2 273 492 A | 6/1994 |
| GB | 2 298 391 A | 9/1996 |
| JP | 2004-315035 A | 11/2004 |
| JP | 2000-255621 A | 9/2009 |
| KR | 10-0711073 B1 | 4/2007 |
| KR | 10-0840926 B1 | 6/2008 |
| KR | 10-0886955 B1 | 3/2009 |
| MX | PA05002905 A | 2/2006 |
| MX | 2010001867 A | 4/2010 |

| | | | | | |
|---|---|---|---|---|---|
| TW | 194965 | 11/1992 | WO | 2008027029 A2 | 3/2008 |
| WO | 89/02402 A1 | 3/1989 | WO | 2008027036 A1 | 3/2008 |
| WO | 93/08084 A1 | 4/1993 | WO | 2008039350 A2 | 4/2008 |
| WO | 97/02997 A1 | 1/1997 | WO | 2008125784 A1 | 10/2008 |
| WO | 00/66450 A1 | 11/2000 | WO | 2008125785 A1 | 10/2008 |
| WO | 20051100186 A1 | 10/2005 | WO | 2008148176 A1 | 12/2008 |
| WO | 2006018556 A1 | 2/2006 | WO | 2010115811 A1 | 10/2010 |
| WO | 2006021291 A1 | 3/2006 | WO | 2011039067 A1 | 4/2011 |
| WO | 2006/099260 A1 | 9/2006 | | | |
| WO | 2006/108853 A1 | 10/2006 | | | |
| WO | 2007/109113 A2 | 9/2007 | * cited by examiner | | |

CONTAINER SEAL WITH REMOVAL TAB AND HOLOGRAPHIC SECURITY RING SEAL

This application claims priority pursuant to 35 U.S.C. 119 (e) to U.S. Provisional Application No. 60/896,820, filed on Mar. 23, 2007 which is incorporated herein by reference in its entirety.

BACKGROUND OF THE INVENTION

1. Field of the Invention

The invention relates generally to a laminated sealing member for closing the mouth of a container, the sealing member having a graspable tab on its upper surface to expedite its removal from the container, and the sealing member also having a holographic security seal layer.

2. Description of the Related Art

In the figures, the first digit of the reference numbers correspond to the figure number. The remaining two digits of the reference numbers for elements within the various figures that correspond to each other always match. Hence, the bottom hot melt adhesive layer, which is essentially same in all of the figures, is assigned the reference number 122 in FIG. 1, 222 in FIG. 2, 322 in FIG. 3, and 422 in FIG. 4.

It is often desirable to seal a bottle, jar, or other container having a screw-on cap by providing a sealing member that attaches across the mouth of the container before the cap is screwed down onto the container for the first time. When the cap is later removed after purchase, the purchaser must penetrate, break, or otherwise remove the sealing member before the contents of the container may be accessed. The cap may then be screwed back into place to keep the contents fresh and to keep the contents from spilling out. If the sealing member is not present when the container is first opened, or if it is damaged, then the purchaser knows that the contents of the container may have been tampered with. And as an anti-counterfeiting measure, such a sealing member may include a hologram visible to the purchaser after the cap is removed, the pattern of the hologram being a unique identifier of a particular manufacturer.

Many sealing members are known which have tabs attached to their upper surface to facilitate their removal. One simply grasps the tab and pulls it to one side, and the entire sealing member is removed from the container in a single motion.

U.S. Pat. No. 5,514,442, which issued to Michael P. Galda, et al. on May 7, 1996 discloses the sealing member 100 shown, in a side cross-sectional view, in FIG. 1 (which is derived from FIG. 4 of the '442 patent). (For clarity, the cross sectioning lines have been omitted from the layers 102, 104, and 110 in FIG. 1 and are shown in the urethane adhesive layers 114 and 116 and hot melt bonding material or adhesive layer 122.) The sealing member 100 is a laminated structure the lower half of which is formed from an aluminium foil layer 110 the underside of which is bonded to a hot melt bonding material or adhesive layer 122. The upper half of the sealing member 100 is formed from a sheet of bleached kraft paper 102 the lower half of which is glued to a polyester layer 104 (most likely a sheet or film of PET, or Polyethylene Terephthalate). As shown, the upper and lower halves of the sealing member 100 are joined by means of an adhesive layer 116 which extends only half way (left-to-center) and which joins the aluminium foil layer 110 to the polyester layer 104, leaving a gap 124 to the right. The sealing member 100 is circular and is die-cut from a much larger sheet of laminated materials, the cutting being positioned to cause the gap 124 to be present in each sealing member 100, thereby forming a removal tab that comprises the kraft paper 102 and the polyester 104 layer above the gap 124 to the right in FIG. 1. The '442 patent teaches that this circular sealing member 100 is inserted deep into a screw-on cap (not shown) which is then screwed onto a container (not shown). Induction heating applied to the neck of the container then heats up the aluminium foil layer 110, causing the hot melt bonding material or adhesive layer 122 to melt and thereby seal the sealing member 100 to the top of the container. After the container is purchased, the purchaser removes the cap and then grasps and pulls on the removal tab and thereby removes the sealing member 100 from the container.

U.S. Pat. No. 6,866,926, which issued to Joe Smelko et al on Mar. 15, 2005, teaches the design of an improved sealing member 200 which is shown, in a side cross-sectional view, in FIG. 2 ((which corresponds to FIG. 3 of the '926 patent). (For clarity, the cross-sectional lines have been omitted from the layers 202, 204, 206, 208, 210, and 212 in FIG. 2 and are shown in the urethane adhesive layers 218 and 220 and hot melt bonding material or adhesive layer 222.) The upper layers of the sealing member 200 comprise an upper PET layer 202 bonded to a lower EVA (ethylene-vinyl acetate) layer 204. The lower layers comprise an aluminium foil layer 210 which is bonded to a PET layer 212 which in turn is bonded to a hot melt bonding material or adhesive layer 322. This design adds a PE (polyethylene) foam layer 208 over the upper surface of the aluminium foil layer 210, as is illustrated in FIG. 2 (which corresponds to FIG. 3 of the '926 patent). The EVA layer 204 is heat bonded to the new PE foam layer 208 in the left half of the sealing member 200, as is shown. To the right, a release strip 206, made of PET, is coated on its underside with a silicon release coating to prevent the strip 406 from sticking to the PE foam layer 208. The PET release strip 206 and the PET upper layer 202 sandwich the left half of the EVA layer 204 to a release tab. The EVA layer 204 and the PE foam layer 208 are heat bonded together.

Several patents teach the incorporation of holographic film into various types of seals for packages and containers. Such holographic sealing members enable counterfeit products to be identified and also signal, by their condition when the seals have previously been tampered with.

Once such Holographic seal is disclosed in U.S. Pat. No. 5,319,475, which issued to Ralph Kay, et al. on Jun. 7, 1994. This patent discloses a package sealing tape having a layered structure. Its upper layer is a removable layer formed from polypropylene or polyester film, smooth and transparent. This upper layer is loosely adhered (by means of wax or corona discharge treatment) to a much thinner, transparent polymer layer. The polymer layer is bonded to an embossable lacquer layer formed from non-cross-linkable polyurethane or polyester. This layer is embossed to define a hologram, and then a metallic film, such as aluminum, is deposited upon this layer and is optionally coated with a polymeric coating. The lowest layer is a pressure sensitive transfer adhesive bound to release paper. In use, the release paper is removed, and then the tape is used to seal a container. The upper layer is scuff resistant, so it may be left on during transit to protect the hologram. It may also be removed. In the face of solvents or heat, the embossable layer and its hologram is quickly and irreversibly damaged, thus making a permanent record of the attempt at tampering with the package. A similar arrangement is disclosed in U.S. Pat. No. 6,659,507, issued to Michael Banahan, et al. on Dec. 9, 2003, which also provides an additional fluorescent pattern visible only under ultraviolet light and a mechanism that breaks up the hologram if the layers are separated.

U.S. Pat. No. 7,012,032, which issued to Steven R. Consentino, et al. on Mar. 14, 2006, discloses in FIG. 3 of the '302 patent a holographic image (col. 7, lines 20-34 of the '032 patent) applied as the top layer in a laminated sealing member for a "bottle type container" with an upper PET layer, an intermediate thermal bonding polymer layer (a co polyester resin), and a lower woven or non-woven reinforcing scrim polymer layer (polyester such as PET) beneath which is an adhesive layer. In its "Background" portion, the '302 patent says: "seals and lids can be constructed to have a tab that extends outwardly from the periphery of the seal so that a user can grasp the tap to aid in removing the seal from the container." ('032 patent, col. 1, lines 37-40) FIG. 3 of the '032 patent discloses a tab 33 that is somehow attached to, and extending outwards from, the periphery of the lowest adhesive layer. The text accompanying this figure says: "Preferably the seal contains a small tab to facilitate removal." Nothing more is said about this tab.

U.S. Pat. No. 4,892,209, which issued to Jan L. Dorfman, et al. on Jan. 9, 1990, discloses a liquor bottle capping assembly which includes a sealing member that comprises two parts: First, a lower circular disk, made of aluminum or "high durometer plastic" or some other material sufficiently strong to resist and/or provide evidence of penetration by a hypodermic needle; and second, an upper circular sheet member 26 that is adhesively laminated to the lower circular disk 60. The upper circular sheet member may be made of metal foil and may carry a laser-imprinted hologram obtained from American Bank Note Holographics, Inc. Alternatively, the circular disk 80 may be constructed from plastic film, metallised plastic, or some other material that will provide evidence of any tampering. The upper circular sheet member initially has a figure-8 shape, and it is folded back upon itself to form joined upper and lower circular portions, the lower circular portion forming the circular sheet member itself, and the upper circular portion forming a removal tab of slightly smaller diameter, as is illustrated in FIGS. 1 and 2 of the '209 patent.

SUMMARY OF THE INVENTION

Briefly summarized, the present invention relates to a holographic sealing member for a container designed for attachment to the rim of an opening in the container. The sealing member comprises a holographic layer having an upper plastic layer on its upper side and a lower embossed image layer on its lower side, having a sealant or adhesive layer attached to at least those portions of the lower side of the holographic layer that are intended to come into direct contact with the container's rim when the sealing member is placed upon and is sealed to the container, and having a metal foil layer over and covering and adhesively bonded to the upper side of the holographic layer that may be inductively heated to actuate the heat actuated sealant. A tab covers and is adhesively bonded to the metal foil layer and may be pulled to remove the sealing member from a container. After this sealing member is attached to a container, and when the tab is pulled to remove the sealing member from the container, almost the entire sealing member pulls away from the container, but those portions of the holographic layer's lower embossed image layer that are attached directly to the rim of the container by the sealant or adhesive layer remain attached to the rim of the container to form a hologram that runs around the container's rim.

DETAILED DESCRIPTION OF THE EMBODIMENTS

Figure 3:
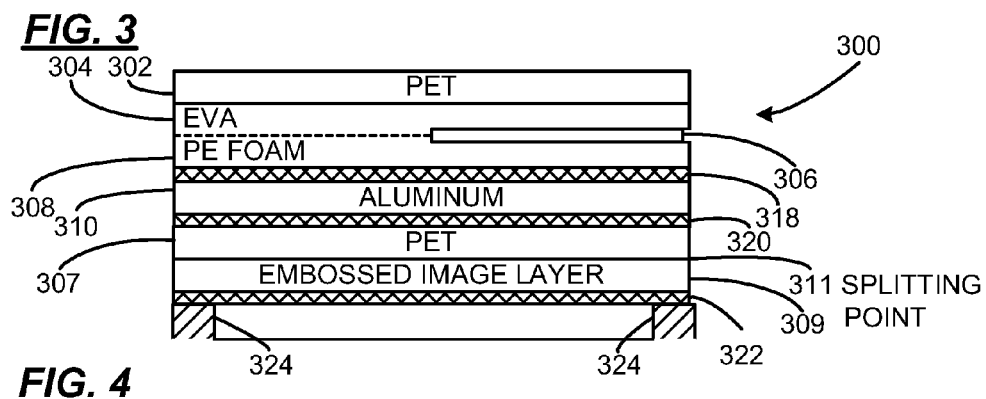
FIG. 3 presents a cross-sectional side view of a laminated sealing member in accordance with an embodiment of the invention having a removable tab structure facing to the right, the sealing member shown attached to the mouth of a container. The vertical dimensions are exaggerated and are not drawn in proportion to the actual vertical dimensions of each layer of the sealing member. (Cross-sectioning lines are omitted from some layers for clarity.)
Figure 4:
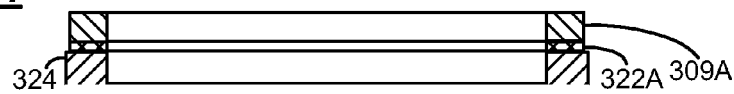
FIG. 4 presents a cross-sectional side view of the laminated sealing member shown in FIG. 3 following removal of the tab and the layers attached to the tab, the lowermost layers of the sealing member shown still attached to the mouth of the container.

A sealing member 300 for a container 324 is designed in accordance with a first embodiment of the present invention and is illustrated in FIGS. 3 and 4. The immediately following paragraphs describe FIGS. 3 and 4. Later paragraphs describe FIG. 5, which presents a related invention.

FIG. 3 presents a side, cross-sectional view of the sealing member 300 and of the upper, circular rim of a PET container 324 to which the sealing member 300 is sealed by induction heating of an aluminum layer 310, which melts the hot melt bonding material or adhesive layer 322 and binds the sealing member 300 to the circular rim of the container 324. (Note that the cross sectioning lines have been omitted from the layers 302, 304, 308, 310, 307, and 309 in FIG. 3 and are shown in the urethane adhesive layers 318 and 320 and hot melt bonding material or adhesive layer 322.)

Figure 1:
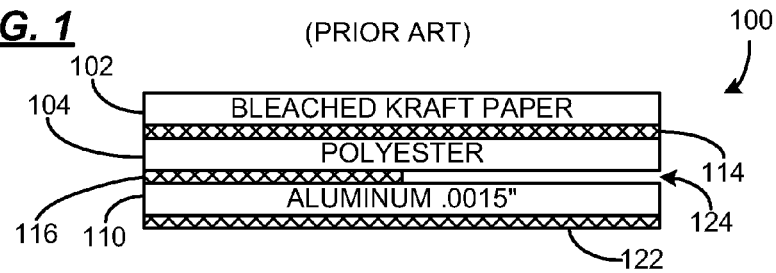
FIGS. 1 and 2 each present a cross-sectional side view of a prior-art laminated sealing member having a removable tab structure facing to the right. The vertical dimensions are exaggerated and are not drawn in proportion to the actual vertical dimensions of each layer of the sealing member. (Cross-sectioning lines are omitted from some layers for clarity.)
Figure 2:
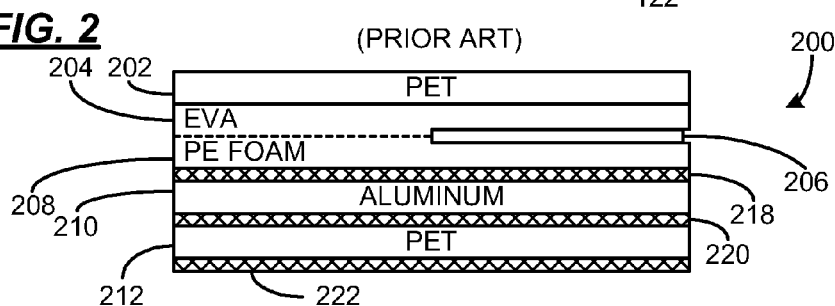

The structure of the sealing member 300 (FIG. 3) is essentially the same as that of the sealing member 200 (FIG. 2 described above) except that the lower PET layer 212 in FIG. 2 has been replaced in FIG. 3 with a holographic film comprising a PET layer 307 bonded to a embossed image layer 309 which bears a holographic image and which has an aluminum substrate. The layer 309 in its turn is bonded by the hot melt bonding material or adhesive layer 322 to the land area of the container 324 (the land area of the container 324 is the uppermost, ring-shaped upper surface of the circular upper rim of the container 324). The PET layer 307 and the embossed image layer 309 are bonded together in such a manner, and with such a bonding strength, that the layers 307 and 309 are separable along their periphery—the bond at a splitting point 311 is not as strong as the bond formed by the layer 322 between the layer 309 and the container 324.

Accordingly, when the tab formed by the layers 302, 304, and 306 is pulled, all of the uppermost layers 302, 304, 308, 310, and 307 of the sealing member 300 are pulled away along with all save a thin peripheral ring of the embossed image layer 309, leaving only a thin peripheral ring 309A (see FIG. 4) of the embossed image layer 309 sealed by means of a thin ring of the hot melt bonding material or sealing layer 322A to the land area of the container 324.

Accordingly, a circular ring of the embossed image layer 309A remains bonded to the land area of the container 324 after the sealing member 300 is removed. Thus, a thin ring of the hologram which the embossed image layer 309A carries remains attached to the upper lip of the container 324, while the remainder of the embossed image layer 309 is peeled away and is removed from the container 324 and is separated from the circular ring portion 309A of the layer 309. Hence, removal of the tab (formed by the layers 302, 304, and 306) necessarily produces destruction of the hologram such that the holographic seal borne by the embossed image layer 309 is torn through and can never be reassembled and reattached to the container 324.

The sealing member 300 is thus entirely removed in a single motion, but the ring portion 309A of the embossed image layer 309 remains behind, attached to the land area of the container 324, torn away from the remainder of the embossed image layer 309 in a way that destroys the hologram and makes it impossible to re-seal the sealing member 300 back onto the container 324. After the sealing member 300 is removed from the container 324, the holographic image is visible on the top side of the rim of the container 324. It is not possible to reseal the container.

The bonding of the PET layer 307 to the embossed image layer 309 is carefully controlled to set the amount of adhesion that exists between the PET layer 307 and the embossed image layer 309. This bonding strength must be low enough so that when force is applied to the tab formed by layers 302, 304, and 306, the sealing member 300 splits at the splitting point 311 around the periphery of the sealing member 300 but only above the land area of the container 324, thus permitting most of the embossed image layer 309 to be ripped away still attached to the layers 302, 304, 306, and 307 but leaving behind the ring portion 309A of the embossed image layer 309 attached to the land area of the container 324, as is shown in FIG. 4. PET holographic film produced by American Bank Note Holographics (ABNH) works well in this application. A product could be designed that would function in the same manner if the holographic film was modified to contain some type of release layer between the PET film layer 307 and the embossed image layer 309. The PET film produced by ABNH has proved (in its normal, unmodified form) to have a structure that functions properly.

The PET layer 307, the embossed image layer 309, and the bond between them are preferably chosen to be relatively heat insensitive so that overheating by inductive heating of the hot melt bonding material or adhesive layer 322 does not adversely affect the amount of effort that is required to remove the sealing member 300. In conventional designs, such as that shown in FIG. 2, it is the seal between the container (not shown in FIG. 2) and the entire sealing member 200 that must be broken, and the amount of effort that is required to remove the sealing member 200 can be adversely affected by overheating during the inductive heat sealing of the sealing member 200 to a container. The ABNH PET holographic film is relatively insensitive to heat variations, as is explained more fully in a later paragraph.

In another embodiment of the invention illustrated in FIGS. 3 and 4, two American Bank Note Holographics, Inc. films are included in the same structure. The structure is the same as described in FIGS. 3 and 4 with the addition of a second holographic film that is laminated between the aluminum foil layer 310 and the holographic film layer (layers 307 and 309) which is coated with the heat actuated coating (the layer 322).

In addition, gold pigmentation is added to the adhesive layer between the two holographic film layers. When separation of the layer 322 and the metal and holographic embossed image layer 309 from the PET layer is invoked upon removal of the sealing member 300, the holographic ring 309A from the primary holographic layer remains on the rim of the PET container 324, and the uncovering of the area where this ring separates from the primary seal exposes the secondary holographic film that appears in gold because of the added pigmentation. This leaves a portion of a holographic image on the container rim and another portion on the removed sealing member 300 components.

The heat activated hot melt bonding material or adhesive layer 322 in FIG. 3 is a polyester heat seal coating 40-3 obtainable from Rohm and Haas. This heat actuated coating is applied to the metallic side of metallised holographic film (comprising the PET layer 307 and the embossed image layer 309 which includes a metal layer formed from aluminum). The PET side (307) of the holographic film is laminated and adhered to an aluminum foil layer 310. Above this foil layer 310 an optional insulating layer 308 (polyethylene foam in FIG. 3, for example) can be applied, and polyethylene, polypropylene, or polyester may be applied above this insulating layer, or these materials may be applied directly to the foil layer if the optional insulating layer 308 is absent. A tab defining PET release strip 306 is placed over and covers at least a portion of the foil layer 310 or insulating layer 308. An EVA or adhesive layer 304 lies above the PET release strip 206 and is covered by a PET layer 302 to form the tab that is used to remove the sealing member 300 from the rim of the container 324. The splitting or separation point 311 occurs within the holographic film layer. Because the embossed image layer 309 is thin and is bonded firmly to the rim of the container 324, in this case a PET container 324 to coincide with the PET heat seal coating (the hot melt bonding material or adhesive layer 322), the upper liner is completely removed from the rim, leaving the PET heat seal coating layer 322A and the metal and image layer 309A only on the rim of the container 324. A strong bond is desired between the layer 322 and the upper lip of the container 324 to firmly attach the ring of embossed image layer 309A to the upper lip of the container 324. Some other heat seal coating can be selected that can provide a seal to other types of containers—for example, a polypropylene heat seal coating or a polyethylene heat seal coating can be used with a container made of those materials. It may also prove feasible to extrusion coat the metal side of the holographic film with a suitable polymer film as thin as 0.5 mils that would provide the desired splitting and adhesion in the rim area of the container 324.

Figure 5:
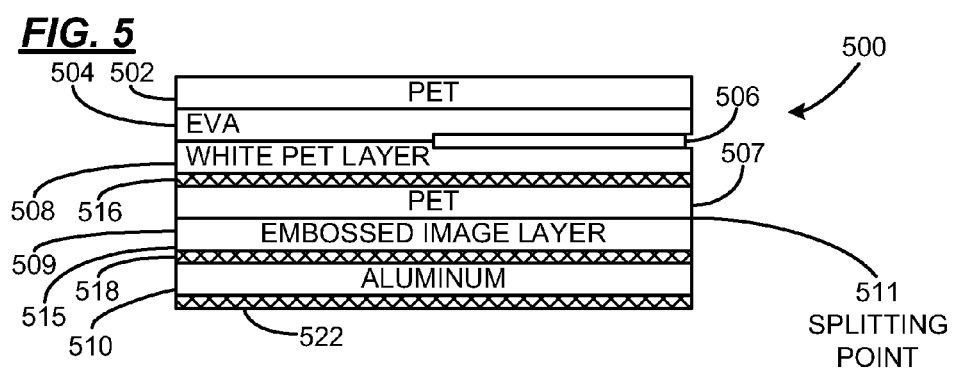
FIG. 5 presents a cross-sectional side view of a laminated sealing member in accordance with another embodiment of the invention having a removable tab structure facing to the right. The vertical dimensions are exaggerated and are not drawn in proportion to the actual vertical dimensions of each layer of the sealing member. (Cross-sectioning lines are omitted from some layers for clarity.)

With reference to FIG. 5, a different but related invention is illustrated embodied in a sealing member 500. (Once again, the cross sectional lines are omitted from the layers 502, 504, 506, 508, 507, 509, and 510 in FIG. 5 for clarity and are shown in the urethane adhesive layers 516, and 518 and hot melt bonding material or adhesive layer 522.)

The sealing member 500 is also similar to the sealing member 200 shown in FIG. 2, but the polyester foam layer 208 shown in FIG. 2 is replaced by a white PET layer 508 that is bonded to a holographic film formed by the combination of a PET layer 507 with an embossed image layer 509 that includes a metal (aluminum) layer, the layers 507 and 509 being bonded together in a manner such as to form a splitting point 511 that gives way then the layers 502, 504, and 506 are pulled. The splitting point 511 is thus within the holographic film structure, between the image layer 509 and the PET layer 507. The urethane adhesive layer 518 binds the metal and embossed image layer 509 to the upper surface of the adhesive coated (adhesive layer 522) aluminum foil layer 510. The adhesive layer 522 is an easily punctured film such as MDPE (medium density polyethylene) 1.5 mils in thickness obtainable from Covalence Specialty Materials Corporation. This design allows the holographic embossed image layer 509 and aluminum film layer 510 to be destroyed easily by puncturing through these two layers. In this design, there is no PET acid barrier layer beneath the two layers 509 and 510, since such a layer would be difficult to penetrate with a finger. Other easily-punctured films, such as a NEX (a trademark of New England Extrusion, Inc.) sealant having an EVA content or SURLYN (a trademark of DuPont for a particular DuPont thermoplastic ionomer resin product), etc., may be used to form the layer 522.

The strength of the bond between the layers 507 and 509 is chosen to cause the sealing member 500 to split apart at 511 when the tab formed by the layers 506, 504, and 502 is pulled upwards and to the side. Accordingly, when the tab formed by the layers 506, 504, and 502 is pulled, the sealing member 500 splits apart at the splitting point 511, uncovering the hologram which is visible in the embossed image layer 509 and leaving in place the seal formed by the aluminum layer 510 that is bonded to the embossed image layer 509.

After removing the upper layers 502, 504, 506, 508, and 507 of the sealing member 500 by pulling on the tab formed by the layers 506, 504, and 502, an individual wishing to access the container (not shown) must then pierce the remaining layers 509 and 510, thus breaking the holographic seal over the container. Hence, the seal on the container cannot be broken without the simultaneous destruction of the hologram.

This design again uses ABNH PET holographic film. The chemistry of the image layer of this product supports heat resistance for the image. The image layer is highly cross-linked, and this gives the film superior heat resistance and also explains why the bond between the layers within the holographic film tend to be relatively weaker. Many holographic films do not have this heat resistance, especially if the image is cast on a polypropylene film. Since induction container sealing can produce temperatures that can be in the range of 350 to 450 degrees Centigrade, if the holographic film technology does not possess adequate heat resistance, then the image or film or both would become distorted during induction heating, particularly when excessive heating is applied.

By removing, separating, or splitting the PET layer away from the image layer, the image of the hologram remains undisturbed and completely legible above only an easily pierced layer of foil and sealant and can be destroyed by simply puncturing it with a finger. If the PET layer were not stripped away when the tab layers were pulled away, then the PET layer would need to have sufficient heat stability, and it would also have to maintain the integrity of the image layer. It would be difficult to puncture through the lining of such a structure.

An alternative arrangement omits the white PET layer 508 and the bonding material 516 and has the EVA layer 504 bonded directly to the PET layer 507.

While several embodiments of the invention have been described, numerous alternatives will occur to those skilled in the art. The claims appended to and forming a part of this patent application are intended to cover all such alternatives that fall within the true scope of the invention.

What is claimed is:

1. A holographic sealing member for a container designed for attachment to a land area of a container rim around an opening in the container, the holographic sealing member comprising:

a holographic layer having an upper plastic layer at its upper side and a lower embossed image layer at its lower side, the upper plastic layer and the lower embossed image layer being separable and the lower embossed image layer being configured to tear when the holographic sealing member is removed from the container;

heat actuated sealant or adhesive layer effective to secure the holographic sealing member to a container, the heat actuated sealant or adhesive layer applied to at least those portions of the lower side of the holographic layer that are in direct contact with the container's rim when the holographic sealing member is placed upon and is sealed to the container;

a metal foil layer bonded to the upper side of the holographic layer; and a tab structure bonded to said metal foil layer, the tab structure comprising a tab configured such that the tab can be pulled to remove the holographic sealing member from the container, wherein after said holographic sealing member is attached to the container, and when the tab is pulled to remove the holographic sealing member from the container and with the tab structure remaining bonded to the metal foil layer and with the placement of the holographic layer below the metal foil layer, the upper plastic layer and the lower embossed image layer of the holographic sealing member separate at a peripheral portion of the holographic sealing member above the land area of the container rim and adjacent the container opening, and the lower embossed image layer tears adjacent the separated peripheral portion to destroy the holographic layer so that the holographic sealing member pulls away from the container with the tab structure except for portions of the holographic layer's lower embossed image layer that are attached directly to the land area of the container rim by the heat actuated sealant or adhesive layer to leave a ring-shaped portion of the lower embossed image layer attached to the land area of the container's rim.

2. The holographic sealing member in accordance with claim 1 which further comprises a polyethylene or polypropylene foam or film layer interposed between the metal foil layer and the tab structure.

3. The holographic sealing member in accordance with claim 2 wherein the tab structure comprises:

a PET tab defining layer extending over and covering a first portion of, but not bonded to the first portion of, the polyethylene or polypropylene foam or film layer;

an EVA layer having an upper and a lower surface, the lower surface bonded to both a second portion of the polyethylene or polypropylene foam or film layer not covered by the PET tab defining layer and to the PET tab defining layer itself, and a second PET layer bonded to the upper surface of the EVA layer.

4. The holographic sealing member in accordance with claim 1 wherein the upper plastic layer of the holographic layer comprises PET and the lower embossed image layer of the holographic layer includes a metal layer.

5. The holographic sealing member in accordance with claim 4 wherein the metal layer of the holographic layer is aluminum.

6. The holographic sealing member in accordance with claim 1 which further comprises a second holographic layer inserted between the holographic layer and the metal foil layer and adhesively bonded to both, the adhesive between the holographic layer and the second holographic layer containing a coloring agent.

7. A holographic sealing member for a container designed for attachment to the land area of a container rim around a container opening, the holographic sealing member comprising:
- a holographic layer having an upper plastic layer on at its upper side and a lower embossed image layer at its lower side, the upper plastic layer and the lower embossed image layer bonded together with a first bond strength, the bonded upper plastic layer and the lower embossed image layer being separable to provide a splitting point within the holographic layer, and the embossed image layer is configured to tear when the holographic sealing member is removed from the container;
- a sealant or adhesive layer attached to at least those portions of the lower side of the holographic layer that are in direct contact with the container's rim when the holographic sealing member is placed upon and is sealed to the container, the sealant or adhesive layer effective to bond the holographic layer to a container rim with a second bond strength, wherein the first bond strength is less than the second bond strength;
- a metal foil layer bonded to the upper side of the holographic layer; and
- a tab structure bonded to said metal foil layer, the tab structure comprising a tab configured such that the tab can be pulled to remove the holographic sealing member from the container, wherein after said holographic sealing member is attached to the container and when the tab is pulled to remove the holographic sealing member from the container and with the tab structure remaining bonded to the metal foil layer and with the metal foil layer remaining bonded to the upper side of the holographic layer, the holographic sealing member pulls away from the container with the tab structure as the lower embossed image layer tears therethrough adjacent the land area of the container rim so that a portion of the lower embossed image layer above the land area of the container rim separates from the upper plastic layer at the splitting point to leave a portion of the holographic layer's lower embossed image layer attached directly to the land area of the container rim by the sealant or adhesive layer due to the second bond strength being greater than the first bond strength to leave a ring-shaped portion of the lower embossed image layer on the container's rim.

8. The holographic sealing member in accordance with claim 7 which further comprises a polyethylene or polypropylene foam or film layer interposed between the metal foil layer and the tab structure.

9. The holographic sealing member in accordance with claim 8 wherein the tab structure comprises:
- a PET tab defining layer extending over and covering a first portion of, but not bonded to the first portion of, the polyethylene or polypropylene foam or film layer;
- an EVA layer having an upper and a lower surface, the lower surface bonded to both a second portion of the polyethylene or polypropylene foam or film layer not covered by the PET tab defining layer and to the PET tab defining layer itself, and
- a second PET layer bonded to the upper surface of the EVA layer.

10. The holographic sealing member in accordance with claim 7 wherein the upper plastic layer of the holographic layer comprises PET and the lower embossed image layer of the holographic layer includes a metal layer.

11. The holographic sealing member in accordance with claim 10 wherein the metal layer of the holographic layer is aluminum.

12. The holographic sealing member in accordance with claim 7 which further comprises a second holographic layer inserted between the holographic layer and the metal foil layer and adhesively bonded to both, the adhesive between the holographic layer and the second holographic layer containing a coloring agent.

\* \* \* \* \*